Jan. 20, 1959  F. O. WIENERT  2,869,850
PREPARATION OF ORE AND METHOD OF HEAT TREATMENT
Filed March 17, 1954
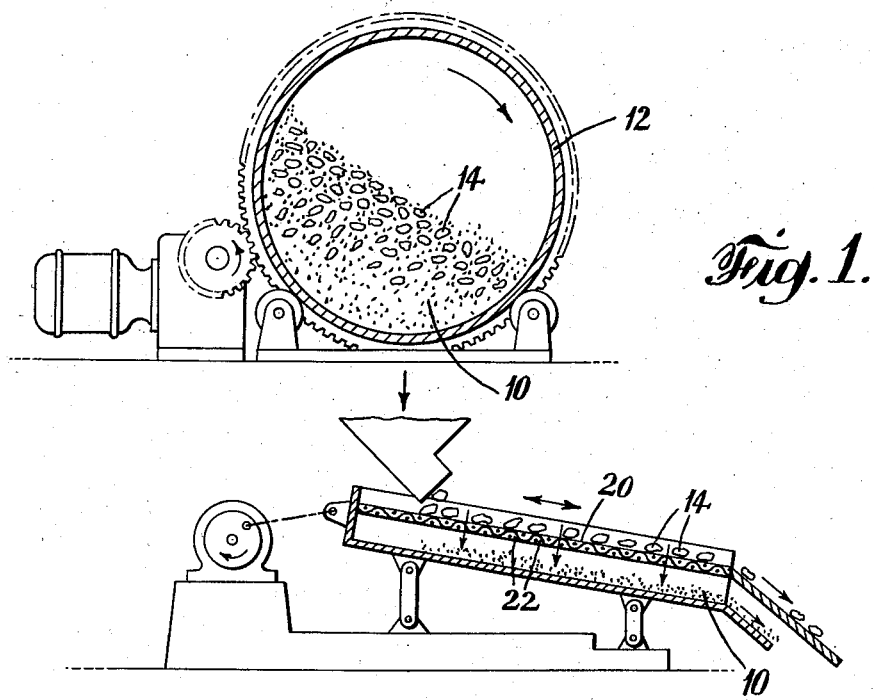
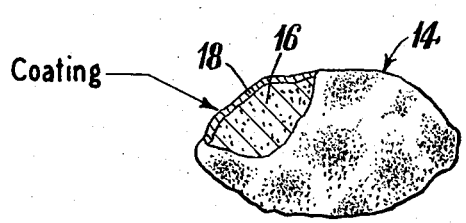
INVENTOR
FRITZ O. WIENERT
ATTORNEY

United States Patent Office 2,869,850
Patented Jan. 20, 1959

2,869,850

PREPARATION OF ORE AND METHOD OF HEAT TREATMENT

Fritz O. Wienert, Niagara Falls, N. Y., assignor to Union Carbide Corporation, a corporation of New York Application March 17, 1954, Serial No. 416,925

2 Claims. (Cl. 263—52)

This invention relates to a method of heat treating materials, and more specifically concerns an improved process for oxidizing or reducing ores in a furnace atmosphere having oxidizing or reducing characteristics.

Most of the present day metallurgical oxidizing or reducing processes of industrial ores are carried out in massive expensive furnaces. Owing to the expenses involved and other reasons, these furnaces must operate continuously at or near rated capacity. Should the production schedule be reduced or interrupted, these furnaces would have to be either operated at a loss, or shut down.

There has been a problem of providing an inexpensive and small-scale process for heat treating materials, which will yield a satisfactory usable product, and which recommends itself to either a reducing or oxidizing heat treatment. In order to fulfill that requirement, such process must be effective in supplanting or at least facilitating in some substantial order some step in the conventional heat treatment procedures for reactant materials. It must be economical in its own procedure, both in dust loss and in loss caused by the formation of detritus on the furnace wall. It should be economical in its consumption of fuel and reducing agent. It should be capable of performance under either oxidizing or reducing conditions. It should be susceptible of application with various types of ores and other materials, and adapted for various metallurgical additions and adjustments.

It is, therefore, an important object of the present invention to provide an improved method of preparing and heat treating reactant materials, comprising forming the materials into agglomerated bodies, providing coatings on the outer surfaces of such formed bodies, and heating the coated bodies in a combustion atmosphere, whereby either oxidation or reduction may be effected within said coated bodies during the heating thereof independently of the character of the surrounding combustion atmosphere.

Another object of the present invention is to provide improved means for protectively coating relatively soft material to reduce substantially the dust and breakage losses ordinarily encountered during the heat treatment of said material in motion.

Another object of the present invention is to provide an improved method of heat treating pellets of reactant material in a rotary kiln, which method comprises admixing a dustless granular substance with the formed pellets, and charging said mixture into said rotary kiln whereby the pellets are embedded in said granular substance, thereby preventing the abrasion and disintegration of the pellets in the kiln and the formation of accretions on the kiln wall.

Another object of the present invention is to provide a simple and inexpensive method of heat treating reactant materials, which method is susceptible of application in either oxidizing or reducing reactions.

Yet another object of the present invention is to provide an improved process for simultaneously performing multiple oxidizing and/or reducing processes in the same furnace atmosphere.

In the drawing is shown an embodiment of the invention in which:

Fig. 1 is a front elevational view partly in section of an apparatus illustrating the principles of the present invention; and Fig. 2 is an enlarged view partly in section of the coated pellet employed in the invention.

The process of the present invention conforms in all respects to all of the above stated requirements for a process for the reduction, oxidation or heat treatment of reactive materials. The present process permits reactions normally practiced in large, expensive furnaces to be carried out in small rotary kilns in a highly efficient manner. The method involves forming coarse ore into minute particles, mixing it with a powdered reactant material, either an oxidizing or a reducing agent, and forming the reactants into pellets or briquettes, using a minimum of binder. Each pellet is covered with a thin, semipermeable coating. The thus formed pellets are heated to reaction temperature in the kiln. Because of the pellet coatings, the reactions of the materials within each pellet may proceed to completion, unhindered by the surrounding kiln atmosphere, even though the kiln atmosphere may not be conducive to such reactions.

Flexibility in the choice of material to be processed is one of the novel features of the method of the instant invention. Materials which are capable of being comminuted into minute particles are particularly well suited in the practice of the method of the present invention. For example, materials such as chromite and ilmenite are suitable substances which will perform satisfactorily in the present invention. However, the invention is not restricted to the use of pulverulent materials, but can be applied equally as well to pieces of natural substances such as soft limestone or limonitic iron ores. Preferably, the material to be processed should be one which is relatively inactive at ambient temperatures, but is amenable to chemical reactions, such as oxidation or reduction at the operating temperatures encountered in the kiln.

Generally, the material to be processed and the oxidizing or reducing agent, as the case may be, are reduced to powder form beforehand, and mixed together to form a homogeneous mixture. Naturally, if the material is to be subjected only to thermal treatment, there is no necessity for adding a reactant agent.

Preparation of the reactants to be treated into pellets or other forms may be accomplished in any one of a number of conventional methods, preferably employing a minimum of binder. Compacted forms of the reactants in the shape of small pellets are generally preferred, although briquette-size forms are equally susceptible of use in the present invention. For convenience, the specific configuration of the compacted reactants will hereinafter be referred to as pellets.

Coatings may be applied to the pellets in a variety of ways. A simple method is to "dust" the pellets by moistening them with water or other suitable wetting agent, and rolling the moistened pellets in a coating powder. The coating powder should be compatible with the reactant pellet materials, i. e., non-reactive at ambient or elevated temperature conditions, and preferably have quick setting and hardening characteristics. Examples of satisfactory coating powders are glue, starch, waterglass and pitch.

As an alternative method of applying coatings to the pellets, the pellets may be moistened as above, but to a considerably lesser degree. If the pellets contain excessive amounts of moisture, they may be partially dried in a stream of hot gases. The thus moistened pellets are then treated with a suspension, solution, or emulsion containing a binder such as waterglass, molasses, glucose or warm tar. The liquid of the solution is quickly absorbed by the pellets, and the suspended solids in the solution adhere to the outer pellet surfaces, forming thin, skin-like coatings thereon.

A further method of producing coatings on pellets of the present invention takes advantage of the low fusion point of certain binder substances. In practicing this method, the pellets are preliminarily heated, and then coated with an easily fusible powder such as powdered pitch having a fusion point lower than the temperature of the heated pellets. As a result, the pitch particles are melted upon contacting the hot, dry surfaces of the pellets, thereby forming adherent coatings.

Pellet disintegration, accretions, and dust losses normally occurring in rotary kilns are minimized in the present invention by preventing abrasive contact between adjacent pellets and between the pellets and the kiln wall. This is accomplished by providing a protective layer of material between the pellets and the kiln wall. The layer of material employed is preferably a granular substance of smaller mesh size than the reactant pellets, but having a particle size sufficiently large so as not to produce dust conditions inside the kiln. In practice, the granules may be introduced into the kiln simultaneously with the pellets, or may be separately charged. As an illustration of the latter procedure, referring to Fig. 1, a granulated material 10 is charged into a rotatable kiln 12, so as to form a bed or layer covering the bottom surface of the kiln. This is followed by the addition of a pellet charge composed of coated pellets 14. As shown in Fig. 2, each of the pellets 14 comprises a pelletized material or reactant mixture 16, preferably formed of minute particles of same, and having a minimum of binder material therein, and an outer protective coating 18. Because of the smaller particle size of the layer of material 10, it forms a supporting matrix for the pellets 14, the matrix being always in adjacency with the bottom of the kiln wall as the kiln rotates, and the pellets being embedded in the granules of the supporting matrix in spaced relation to the kiln wall. Consequently, thermal treatment of the pellets in the kiln may be carried out without creating the abrasive and other undesirable effects heretofore encountered in the prior art.

When the pellets 14 and the embedding material 10 are simultaneously introduced into the kiln 12, such introduction is preceded by a preliminary mixing operation of the pellets with the embedding material outside the kiln. As the mixture is charged into the kiln, the relatively small particles of the embedding material 10 gravitate toward the bottom wall of the kiln, and assume the function of a supporting bed for the pellets 14 in substantially the same manner as if the granules and pellets had originally been sequentially fed into the kiln.

The above-described methods of charging the embedding material 10 and the pelletized reactants 16 into the kiln 12 have been found to protect the pellet charge from abrasion and disintegration to such an extent that in some instances the need for any protective coating is obviated. This, of course, minimizes the amount of binder material required to strengthen and preserve the pellet shape without forming dust or causing other harmful effects.

The embedding material may be varied to produce either oxidizing or reducing combustion conditions within the kiln. Thus material such as coal, coke or other partly combustible carbonaceous matter will produce reducing conditions in the kiln, and in this particular instance may also serve as a source of fuel to sustain such combustion conditions. On the other hand, oxidizing conditions in the kiln chamber may be established by the use of an inert embedding material such as sand or limestone.

According to the present invention, metallurgical processes normally practiced in large expensive furnaces, such as the reduction of iron ore in a blast furnace, may be efficiently performed in smaller, less expensive heating vessels, as for example rotary kilns. In order for coated ore pellets to be efficiently heated in a rotary kiln, control of the chemical reaction taking place within the pellets during heat treatment is essential. To this end, the pellet coatings 18 insulate the pellet contents from contact with the furnace atmosphere. This permits reactions, either oxidation or reduction as the case may be, to take place within the pellets in the presence of a kiln atmosphere, which would otherwise have a reducing or oxidizing effect respectively on the reactant materials in the pellets. For example, in coated pellets containing iron oxide and carbon, the carbon reduces the iron oxide to metallic iron even though the surrounding gaseous atmosphere in the kiln is of a strongly oxidizing character. Similarly, the pellet material may be oxidized by including suitable oxidizing agents within the pellets. In this manner, control of the chemical reaction inside the pellet is achieved without being affected by the oxidizing or reducing properties of the surrounding kiln atmosphere.

Owing to the insulation qualities of the pellet coatings, the chemical reaction occurring in the ore pellets as a whole is composed of the sum of the individual reactions, which is equal to the number of coated pellets. Each pellet reaction proceeds to completion unhindered by the chemical reactions occurring in the remaining pellets and independently of the combustion atmosphere. Moreover, because each pellet is effectively isolated from each other, pellets of different compositions may be simultaneously heat treated in the same atmosphere without affecting each other. In this manner it is possible to simultaneously perform multiple oxidizing and/or reducing processes in the same furnace atmosphere.

Upon completion of the heating operation, the kiln discharge is treated to separate the pellets 14 from the protective embedding material 10. The means for such separation are many and varied. Preferably, the kiln discharge is passed over an inclined screen or apertured grate 20 having openings 22 therein small enough to retain the treated pellets 14, but sufficiently large to pass the embedding material 10 therethrough. The separated granules 10 may then be recycled, if feasible, by admixing it with a fresh pellet charge for subsequent heat treatment in the kiln 12.

Further beneficiation of the kiln discharged pellets may be carried out, if necessary, to remove either oxidation or reduction products resulting from the heat treatment in the kiln. To accomplish this, the undesirable oxides or metallic elements in the discharged pellets may be extracted by any of a number of known methods. An example of one method which is applicable to the removal of iron from chromite ore pellets treated as above is to cool and comminute the treated chromite ore pellets, followed by a leaching of the contained iron, using dilute acid.

The method of the present invention has been successfully applied in a variety of ways to a considerable number of substances and finely comminuted reactant materials. The following examples will serve to illustrate the principles and broad applicability of the present invention.

*Example I.—Partial reduction of chromite ore in a rotary kiln*

According to the instant invention, 13 parts of chromite ore having a chromium to iron ratio of 1.67, and passing through a 100 mesh screen (0.147 mm. openings) were mixed with one part of coal dust and with about 2½ parts of water containing a wetting agent. The moist mix was pelletized and the pellets were dried in a stream of hot gases and subsequently submerged for a few seconds in heated tar. The thus treated pellets were fed together with about 9 parts of coke of 16 mesh screen size (0.991 mm. openings) into a rotary kiln, where the contents were heated to approximately 1250° C. Following this step, the discharge of the kiln was passed over a water-cooled grate to separate the coke from the pellets. The reclaimed coke was augmented with make-up fuel, added to a fresh charge of green (untreated) pellets and the kiln cycle repeated. The discharged and separated pellets were cooled in a rotating air-tight cooler, crushed, and then leached with dilute sulphuric acid. The dry residue contained 34% chromium and 5.5% iron, which corresponds to a chromium to iron ratio of 6.2.

In comparison, when a loose mix of the same comminuted chromite ore with coal dust was heated in a rotary kiln without nodulizing, coating, and embedding the pellets in coke as described hereinabove, the residue remaining after extraction by acid showed a chromium to iron ratio of only 3.1. In this latter procedure, adherence of sintered mixture to the kiln wall was encountered.

Example II.—Partial reduction of ilmenite

A dry mix of 9 parts of 200 mesh ilmenite ore (passing through a screen having 0.07 mm. openings) with one part of coal dust was moistened with one-half part of water containing 5% sodium silicate. The damp mix was pressed into briquettes. These briquettes were flooded for a few seconds with an aqueous solution containing 15% sodium silicate and were fed together with an equal volume of 28 mesh coke (passing through a screen having 0.589 mm. openings) into a rotary kiln and heated to 1300° C. The discharge of the kiln was then passed over an inclined screen to separate the coke from the briquettes, the coke being used for recycling purposes, and the briquettes being further treated in a subsequent leaching operation. After leaching the separated briquettes with dilute sulphuric acid, an analysis of the resulting product showed 0.5% iron and 57.5% titanium. The original ilmenite (FeO—TiO₂) contained 33.2% iron and 29.4% titanium.

Example III.—Calcination of calcium hydrate in a shaft furnace

Ten parts of calcium hydrate were mixed with one part of water and briquetted. The briquettes were submerged in water containing 18% sodium silicate for a few seconds during which time the solution was adsorbed by the pellets forming a coat around the pellets. The coated pellets were heated in a direct-fired gas shaft furnace to a maximum temperature of 650° C. The discharged briquettes contained 0.3% carbon dioxide and the lime was very active, due to the low temperature applied.

In contrast, the same briquettes without the coating described above contained 6.2% carbon dioxide after the same heat treatment.

Example IV.—Oxidation of chromite ore in a rotary kiln

Ten parts of chromite ore of 200 mesh size (passing through a screen having 0.074 mm. openings) were mixed with seven parts of fine limestone, six parts of calcium hydrate and three parts of soda ash. The warmed mix was nodulized with the help of a saturated soda ash solution. Thereafter, the nodules were fed together with granular limestone into an internally heated rotary kiln, the granular limestone acting in the capacity of an embedding material. Upon completion of the heating operation, the kiln discharge was processed to separate the nodules from the embedding material, the latter being recycled through the kiln, and the nodules being leached for chromates. Results of this run disclosed that the granular limestone prevented breakage and abrasion of the briquettes before they started to sinter, and prevented sticking and accretions on the kiln wall.

Example V.—Reduction of phosphate rock

Forty parts of phosphate rock containing 14% phosphorus were comminuted to pass through a 100 mesh screen (0.147 mm. openings), and mixed with 12 parts of coke dust, four parts of fine silica, and seven parts of water containing 1% suspended bentonite. The moist mixture was nodulized. The nodules were dried, submerged for a few seconds in a suspension of clay and water, redried, and mixed in equal volumetric proportion with coke 24 x 100 mesh size (passing through a screen having 0.701 mm. openings, but being retained by a screen having 0.175 mm. openings). The mix was heated in a rotary kiln to 1350° C. The discharged mixture of fritted nodules and coke was separated. Make-up coke and fresh nodules were added to the reclaimed coke, and the resulting mixture was heated in the rotary kiln to produce additional fritted nodules. The volatile phosphorus and its compounds were condensed and precipitated out of the kiln gases.

From the above description it will be seen that an improved method of heat treatment of compacted bodies of reactant materials may be effected by producing a hard coating around such bodies and embedding such bodies in a protective, preferably non-dust producing, granular material during the heating operation. The cooperative action of the coatings and the granular material prevent the abrasion and disintegration of said bodies, avoids the formation of undesirable dust conditions, and controls the chemical reaction occurring within said bodies.

It will be understood that variations and modifications may be effected without departing from the novel concepts of the present invention.

I claim:

1. In the treatment of ores, the method comprising nodulizing said ore, coating said nodules with a protective abrasion resistant coating, introducing a finely divided cushioning material of smaller mesh size than said coated nodules into a rotary kiln, adding said coated nodules to said kiln, simultaneously rotating said kiln and rotating, tumbling and heating the contents of said kiln, discharging said kiln contents upon completion of said heat, separating said coated nodules from said kiln discharge, recycling the remaining material in said kiln discharge with fresh nodules, and extracting undesirable metals and metallic oxides from said kiln discharged nodules to further beneficiate same.

2. In the reaction of finely divided solid reactants, the method comprising mixing and pelletizing said reactants; coating the pellets so formed with an abrasion resistant semi-permeable coating; introducing a granular, substantially dust free, material of smaller mesh size than said coated pellets into a rotary furnace; adding said coated pellets into said rotary furnace, simultaneously rotating said rotary furnace and rotating, tumbling and heating the contents of said rotary furnace, whereby stratification of said furnace contents and reaction of the reactant components of said coated pellets are effected, and said coated pellets are supportably cushioned on said granulated material in spaced relation to the bottom surface of said furnace.

References Cited in the file of this patent

UNITED STATES PATENTS

| | | |
|---|---|---|
| 1,415,094 | Jones | May 9, 1922 |
| 1,712,132 | Breyer et al. | May 7, 1929 |
| 2,036,952 | Middlelboe | Apr. 7, 1936 |
| 2,052,329 | Wendeborn | Aug. 25, 1936 |
| 2,127,632 | Najarian | Aug. 23, 1938 |
| 2,332,219 | Harshberger | Oct. 19, 1943 |
| 2,378,438 | Saslaw et al. | June 19, 1945 |